(12) United States Patent
Takeuchi et al.

(10) Patent No.: US 8,920,653 B2
(45) Date of Patent: Dec. 30, 2014

(54) DESALINATION APPARATUS AND DESALINATION METHOD

(75) Inventors: Kazuhisa Takeuchi, Tokyo (JP); Yoshiaki Ito, Tokyo (JP); Hidemasa Kakigami, Tokyo (JP); Hideo Iwahashi, Tokyo (JP); Katsunori Matsui, Tokyo (JP); Kenji Tanaka, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 103 days.

(21) Appl. No.: 13/508,155
(22) PCT Filed: Nov. 16, 2010
(86) PCT No.: PCT/JP2010/070393
§ 371 (c)(1), (2), (4) Date: May 4, 2012
(87) PCT Pub. No.: WO2011/065257
PCT Pub. Date: Jun. 3, 2011

(65) Prior Publication Data
US 2012/0211420 A1 Aug. 23, 2012

(30) Foreign Application Priority Data
Nov. 30, 2009 (JP) .................. 2009-271847

(51) Int. Cl.
*C02F 1/44* (2006.01)
*C02F 1/66* (2006.01)
*C02F 1/70* (2006.01)
*B01D 61/02* (2006.01)
(Continued)

(52) U.S. Cl.
CPC .............. *C02F 1/441* (2013.01); *B01D 61/025* (2013.01); *B01D 61/04* (2013.01);*B01D 61/10* (2013.01); *B01D 61/12* (2013.01);
(Continued)

(58) Field of Classification Search
CPC .............. C02F 9/00; C02F 1/441; C02F 1/42; C02F 2101/20; C02F 1/26; C02F 1/44; C02F 1/66; C02F 1/70; A61M 1/16; A61M 1/656; B01D 61/08; B01D 61/12

USPC ............ 210/638, 96.2, 652, 252, 321.6, 322, 210/102
See application file for complete search history.

(56) References Cited

U.S. PATENT DOCUMENTS
2010/0292844 A1* 11/2010 Wolf .......................... 700/271

FOREIGN PATENT DOCUMENTS
JP    07-171565 A    7/1995
JP    07-308671 A    11/1995
(Continued)

OTHER PUBLICATIONS

Written Opinion of the International Searching Authority dated Feb. 22, 2011, issued in International Application No. PCT/JP2010/070393, English translation Only (4 pages).
(Continued)

*Primary Examiner* — Krishnan S Menon
*Assistant Examiner* — Dwan A Gerido
(74) *Attorney, Agent, or Firm* — Westerman, Hattori, Daniels & Adrian, LLP (57) ABSTRACT

A desalination apparatus includes a pretreatment device 13 having a pretreatment membrane 13a that filters suspended matters in raw water 11 with added chlorine-containing water 12, a reverse osmosis membrane device 17 having a reverse osmosis membrane 16 that removes a salt content from filtrate water 14 supplied from the pretreatment device 13 to produce permeated water 15, and a reducing-agent injection device 30 that neutralizes the added chlorine on an upstream side of the reverse osmosis membrane device 17. The reducing-agent injection device 30 extracts a part 14a of the filtrate water 14, adds metering SBS solution 18 to the part, obtains a maximum change point (equivalence point) of the oxidation-reduction potential of a reducing agent and chlorine, obtains reducing-agent additive concentration (Csm) corresponding to the equivalence point, and supplies the SBS solution 18 corresponding to the concentration to the filtrate water 14 to thereby neutralize the chlorine.

5 Claims, 5 Drawing Sheets

(51) Int. Cl.
  *B01D 61/04* (2006.01)
  *B01D 61/10* (2006.01)
  *B01D 61/12* (2006.01)
  *C02F 1/76* (2006.01)

(52) U.S. Cl.
  CPC .............. *C02F 1/76* (2013.01); *B01D 2311/04* (2013.01); *C02F 2209/06* (2013.01)
  USPC .......... 210/638; 210/96.2; 210/652; 210/252; 210/321.6; 210/322; 210/102

(56) References Cited

FOREIGN PATENT DOCUMENTS

| | | | |
|---|---|---|---|
| JP | 09-057076 A | 3/1997 | |
| JP | 09-192680 A | 7/1997 | |
| JP | 10-090212 A | 4/1998 | |
| JP | 2004-000938 A | 1/2004 | |
| JP | 2005-246158 A | 9/2005 | |
| JP | 2007-152192 A | 6/2007 | |
| JP | 2008-212915 A | 9/2008 | |
| JP | 2008212915 | * | 9/2008 |
| WO | 2006/054351 A1 | 5/2006 | |

OTHER PUBLICATIONS

Japanese Written Opinion of PCT/JP2010/070393.

International Search Report on mailing date Feb. 22, 2011 for PCT/2010/070393.

* cited by examiner

DESALINATION APPARATUS AND DESALINATION METHOD

TECHNICAL FIELD

The present invention relates to a desalination apparatus and a desalination method capable of smoothly and efficiently neutralizing chlorinated raw water with a reducing agent.

BACKGROUND ART

In a seawater desalination plant, a seawater desalination apparatus (hereinafter, referred to as a desalination apparatus) is used for obtaining fresh water from raw water (seawater) through desalination treatment so that clean water can be used.

Such a desalination apparatus is provided with a pretreatment device using a RO membrane (reverse osmosis membrane), a UF membrane (ultrafilter membrane), or a MF membrane (microfilter membrane) in order to remove suspended matters in seawater as raw water. Furthermore, chlorination for adding a chlorine agent (chlorine-containing water) to the raw water is generally carried out on the raw water in order to perform sterilization, eliminate algae, and remove organic matters, iron, manganese, or ammonia. In the chlorination, liquid chlorine, sodium hypochlorite, chlorine obtained by electrolysis of salt water, or the like is used.

Those obtained through the chlorination and filtration treatment are subjected to the desalination treatment by a reverse osmosis membrane device having a RO membrane.

Incidentally, although problems may not occur when the RO membrane is made of a material with chlorine-resistance (e.g., cellulose acetate), when a material without chlorine-resistance (e.g., polyamide membrane) is used as the RO membrane, it is necessary to neutralize chlorine with a reducing agent at the preceding stage of the reverse osmosis membrane device.

As the reducing agent, sodium bisulfate (referred to as "SBS") for example is used (see Patent Literatures 1 to 3).

Figure 5:
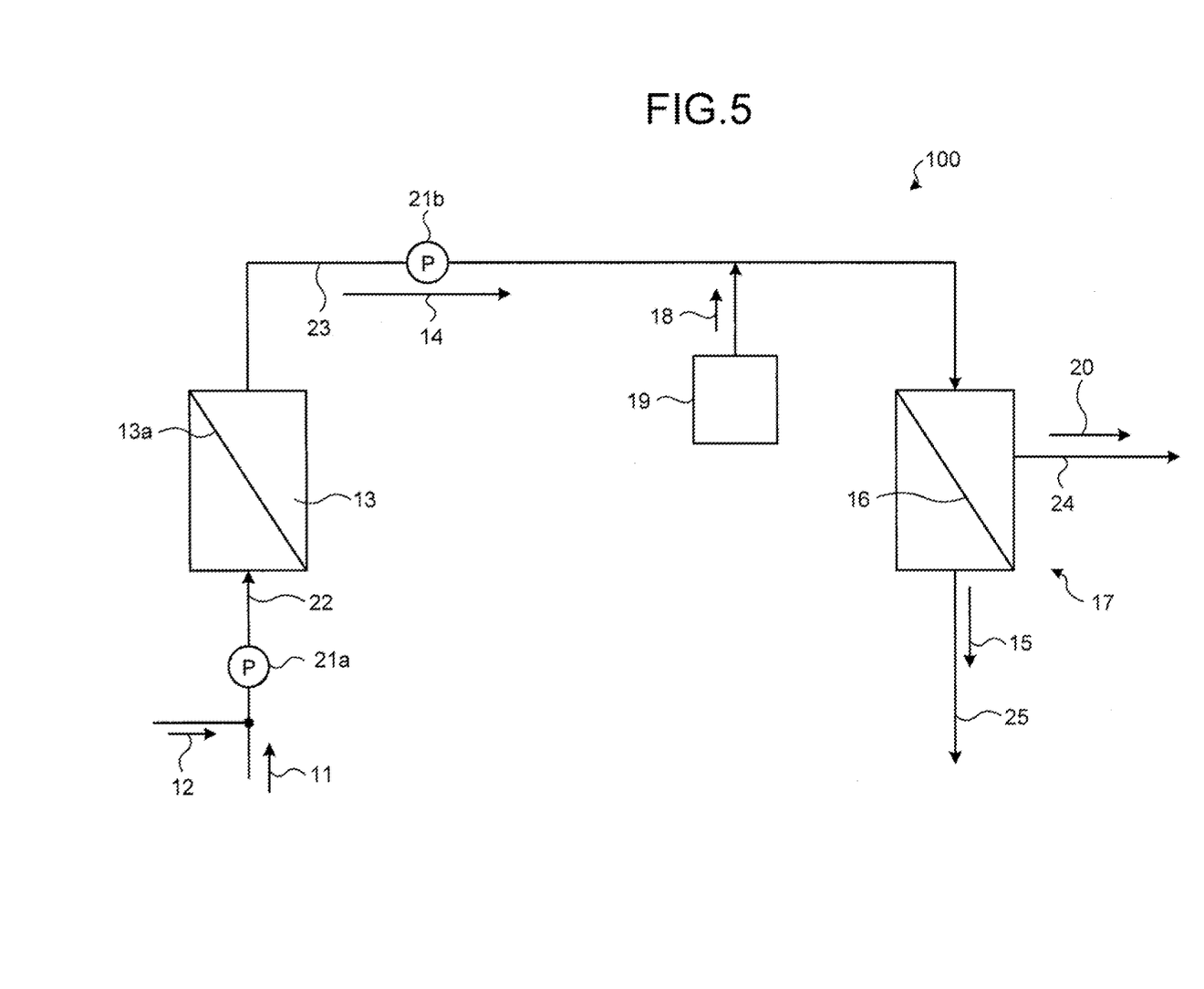
FIG. 5 is a schematic diagram of a desalination apparatus according to the conventional technology.

An example of a desalination apparatus that performs conventional chlorination and neutralization treatment is illustrated in FIG. 5.

As illustrated in FIG. 5, a conventional desalination apparatus 100 includes a pretreatment device 13 having a pretreatment membrane 13a that filters suspended matters in raw water 11 to which chlorine-containing water 12 is supplied, a reverse osmosis membrane device 17 having a reverse osmosis membrane (RO membrane) 16 that removes a salt content from filtrate water 14 supplied from the pretreatment device 13 to thereby produce permeated water 15, and a reducing agent tank 19 that supplies SBS solution 18 to the filtrate water 14 on an upstream side of the reverse osmosis membrane device 17. The desalination apparatus 100 removes the suspended matters and performs chlorination. In FIG. 5, the reference numeral 20 denotes concentrated water, 21a and 21b denote solution sending pumps, 22 denotes a raw water line, 23 denotes a filtrate water line, 24 denotes a concentrated water line, and 25 denotes a permeated water line.

Patent Literature 1: Japanese Patent Application Laid-open No. H7-308671

Patent Literature 2: Japanese Patent Application Laid-open No. H7-171565

Patent Literature 3: Japanese Patent Application Laid-open No. H9-57076

DISCLOSURE OF INVENTION

Problem to be Solved by the Invention

Incidentally, although it is desirable to directly determine the quantity of chlorine when neutralizing the chlorine-containing water 12 with the SBS solution 18, because an analyzing device is expensive, the oxidation-reduction potential (ORP) of the filtrate water 14 is measured by an ORP meter not illustrated to confirm completion of the neutralization. However, the absolute value of the ORP meter may vary due to the property (e.g., pH) of the raw water 11, continuous use of the ORP electrode, dirt on the electrode, or fluctuation in manufacturing factors of the ORP meter itself.

Therefore, when the SBS solution 18 is added to the filtrate water 14, if the absolute value of the ORP of the raw water 11 after the addition is directly measured and the supply amount of the SBS solution 18 is controlled by using the measured absolute value as a target value, the injection amount of the SBS solution 18 may be insufficient or excessive due to the error mentioned above. Consequently, when the injection amount is insufficient, the reverse osmosis membrane 16 at the subsequent stage may be damaged, and, when the injection amount is excessive, running cost may be increased or SBS-induced sulfur compound may be attached to the reverse osmosis membrane 16 to thereby cause clogging or the like.

In view of the above problems, an object of the present invention is to provide a desalination apparatus and a desalination method capable of smoothly and efficiently neutralizing chlorinated raw water by using a reducing agent.

Means for Solving Problem

To solve the problems mentioned above, the inventors of the present invention have actively studied and found that a value of the equivalence point of oxidation agent (chlorine) and SBS, at which the indicated value of the ORP meter sharply changes, is maintained stable without being affected by various variable factors even when there is individual variability in the absolute value of the ORP meter. The present invention is made based on the above findings.

According to an aspect of the present invention, a desalination apparatus includes: a reverse osmosis membrane device including a reverse osmosis membrane that removes a salt content from raw water with added chlorine-containing water to thereby produce permeated water; and a reducing-agent injection device that neutralizes the added chlorine on an upstream side of the reverse osmosis membrane device. The reducing-agent injection device extracts a part of the raw water, adds metering reducing agent solution to the part of the raw water, obtains a maximum change point of an oxidation-reduction potential of a reducing agent and chlorine, obtains reducing-agent additive concentration corresponding to an equivalence point of the reducing agent and the chlorine, and supplies the reducing agent solution corresponding to the reducing-agent additive concentration to the raw water to thereby neutralize the chlorine.

Advantageously, the desalination apparatus further includes a pretreatment membrane that filters suspended matters in the raw water with the added chlorine-containing water.

Advantageously, in the desalination apparatus, the reducing-agent injection device includes an extraction line that extracts a part of filtrate water; a metering reducing agent supplying unit that supplies the metering reducing agent solution to extracted water that is extracted through the extraction line; and an oxidation-reduction potential (ORP) meter that measures an oxidation-reduction potential of mixture with the added metering reducing agent solution. While the metering reducing agent solution is supplied to the extracted water, the ORP meter measures an equivalence point as the maximum change point of the extracted water and the reducing agent solution, and an arithmetic control processing unit performs control of obtaining a reducing-agent additive concentration corresponding to the obtained equivalence point, and calculating the additive amount of the reducing agent solution, which is to be supplied to the filtrate water on the upstream side of the reverse osmosis membrane device, so as to correspond to the reducing-agent additive concentration corresponding to the equivalence point, for supplying the reducing agent solution from a reducing agent tank to the raw water.

According to another aspect of the present invention, a desalination method implemented by using a reverse osmosis membrane device including a reverse osmosis membrane that removes a salt content from raw water to thereby produce permeated water includes: extracting a part of the raw water; adding metering reducing agent solution to the part of the raw water; obtaining an equivalence point as a maximum change point of an oxidation-reduction potential of a reducing agent and chlorine; obtaining reducing-agent additive concentration corresponding to the equivalence point; and supplying the reducing agent solution corresponding to the reducing-agent additive concentration to the raw water, thereby neutralizing the raw water to be supplied to the reverse osmosis membrane device.

Effect of the Invention

According to the present invention, when chlorinated raw water is neutralized by using a reducing agent, a part of filtrate water is extracted to separately measure ORP, and the supply amount of SBS solution to be supplied to the raw water can be optimized based on neutralization information at the equivalence point. Therefore, the neutralization can reliably and efficiently be performed.

BEST MODE(S) FOR CARRYING OUT THE INVENTION

Exemplary embodiments of the present invention will be described in detail below with reference to the accompanying drawings. The present invention is not limited by the embodiments. Constituent elements in the embodiments include elements that can readily be conceived by a person skilled in the art, or elements being substantially similar thereto.

Embodiment

Figure 1:
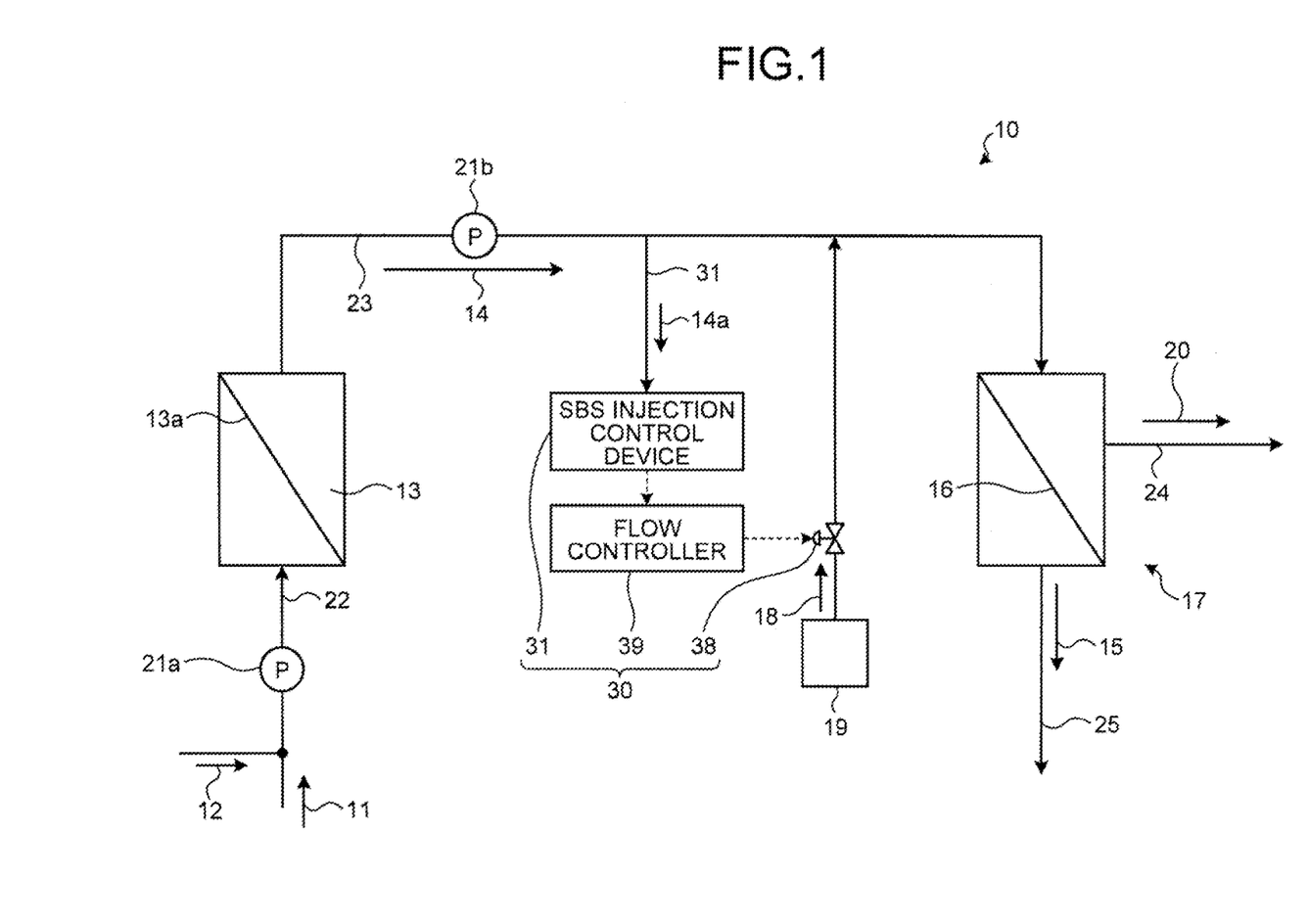
FIG. 1 is a schematic diagram of a desalination apparatus according to an embodiment.

A desalination apparatus according to an embodiment of the present invention will be described with reference to the drawings. FIG. 1 is a schematic diagram of the desalination apparatus according to the embodiment. The components identical to those of the desalination apparatus described in connection with the conventional technology are denoted by the identical reference numerals, and the explanation thereof is not repeated.

As illustrated in FIG. 1, a desalination apparatus 10 according to the embodiment includes the pretreatment device 13 having the pretreatment membrane 13a that filters suspended matters in the raw water 11 with the added chlorine-containing water 12, the reverse osmosis membrane device 17 having the reverse osmosis membrane (RO membrane) 16 that removes a salt content from the filtrate water 14 supplied from the pretreatment device 13 to thereby produce the permeated water 15, and a reducing-agent injection device 30 that neutralizes the added chlorine on an upstream side of the reverse osmosis membrane device 17. The reducing-agent injection device 30 extracts a part 14a of the filtrate water 14, adds the SBS solution 18 (see FIG. 2) as a metering reducing agent to the part, obtains a maximum change point (the equivalence point) of the oxidation-reduction potential of the reducing agent and the chlorine, obtains reducing-agent additive concentration (Csm) corresponding to the equivalence point, and supplies the SBS solution 18 as the reducing agent corresponding to the concentration to the filtrate water 14 by using a flow controller 39 to thereby neutralize the chlorine.

According to the present invention, an example is described in which the pretreatment device 13 having the pretreatment membrane 13a is installed to filter suspended matters in the raw water 11 with the added chlorine-containing water 12. However, the present invention is not limited to this example, and it is possible not to install the pretreatment device 13.

Figure 2:
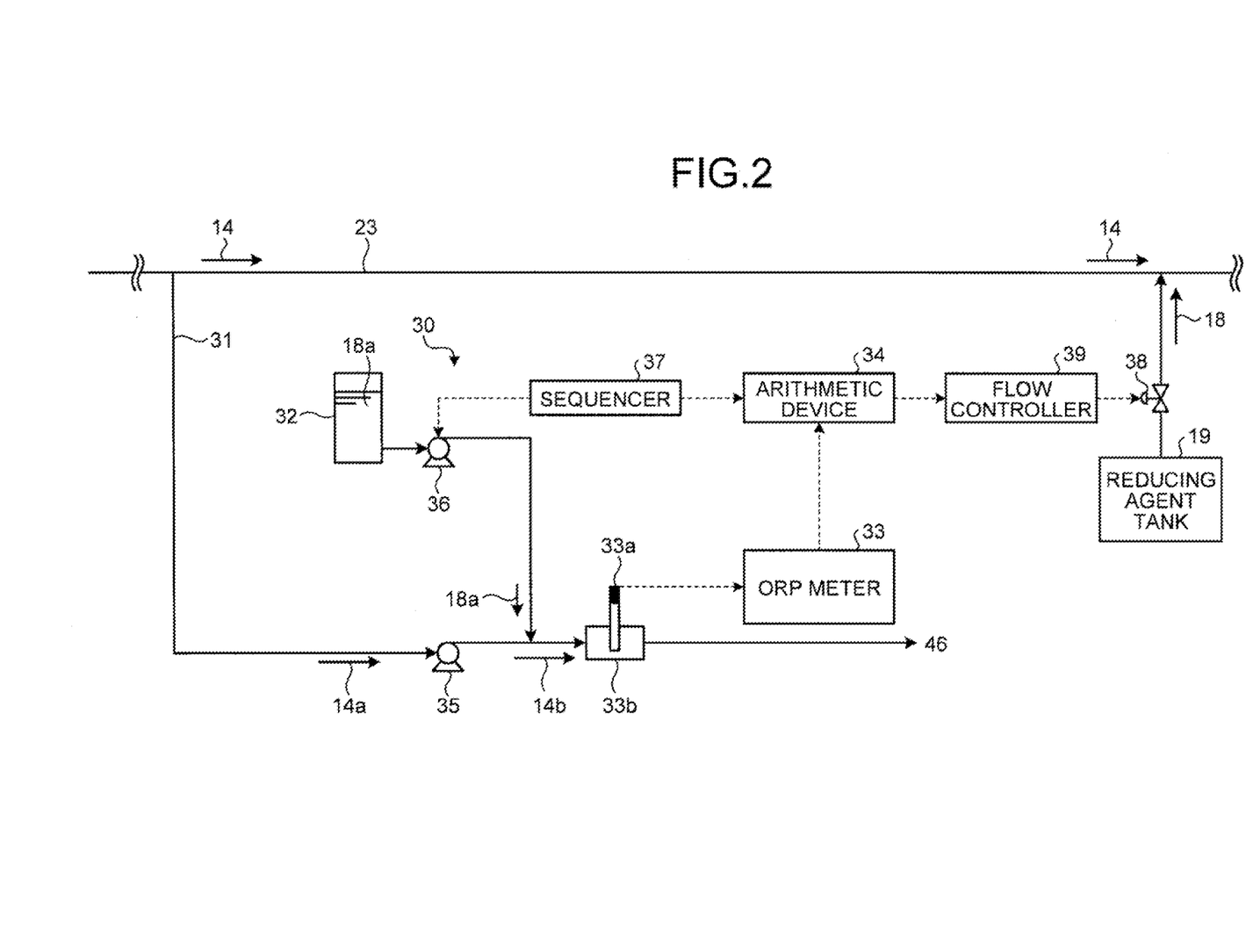
FIG. 2 is a schematic diagram of a reducing-agent injection device according to the embodiment.

FIG. 2 illustrates an example of the reducing-agent injection device according to the embodiment.

As illustrated in FIG. 2, the reducing-agent injection device 30 according to the embodiment includes an extraction line 31 that extracts the partially-extracted water 14a of the filtrate water 14 flowing through the filtrate water line 23 from the pretreatment device (not illustrated) as sample water, a metering SBS supply tank 32 as a metering reducing agent supplying unit that supplies SBS solution 18a as metering reducing agent solution to the partially-extracted water 14a that has been extracted, and an oxidation-reduction potential (ORP) meter 33 that includes an electrode 33a and a measuring unit 33b and measures the oxidation-reduction potential of mixture 14b with the added metering SBS solution 18a.

While the metering SBS solution 18a is added to the partially-extracted water 14a, the ORP meter 33 obtains the equivalence point as the maximum change point of the metering SBS solution and the partially-extracted water. Furthermore, an arithmetic device 34 performs arithmetic control processing of obtaining the reducing-agent additive concentration (Csm) of the metering SBS solution 18a corresponding to the obtained equivalence point, and calculating the additive amount of the SBS solution 18, which is to be supplied to the filtrate water 14 on the upstream side of the reverse osmosis membrane device 17, so as to correspond to the reducing-agent additive concentration (Csm), for performing flow regulation control to supply the SBS solution 18 from the reducing agent tank 19 to the filtrate water 14.

In FIG. 2, a reference numeral 35 denotes a metering pump that supplies the partially-extracted water 14a to the measuring unit 33b, 36 denotes a flow-variable metering pump that supplies the metering SBS solution 18a, 37 denotes a sequencer, 38 denotes a control valve that controls the supply amount of the SBS solution 18, 39 denotes the flow controller, and 46 denotes discharged water.

As illustrated in FIG. 2, because the filtrate water 14 subjected to the pretreatment by the pretreatment device 13 contains chlorine, the partially-extracted water 14a of the filtrate water 14 containing the chlorine-containing water 12 is continuously supplied as the sample water to the measuring unit 33b of the oxidation-reduction potential (ORP) meter 33 by the metering pump 35.

The flow-variable metering pump 36 that has received a signal from the sequencer 37 supplies and mixes the metering SBS solution 18a into the partially-extracted water 14a as the sample water in a predetermined pattern while changing the supply flow rate.

Subsequently, the measuring unit 33b measures the oxidation-reduction potential (ORP) of the mixture 14b, and the arithmetic device 34 executes an arithmetic function to obtain the maximum change point (the equivalence point) of the oxidation-reduction potential of the reducing agent and the chlorine based on signals from the ORP meter 33 and the sequencer 37, obtain the reducing-agent additive concentration (Csm) corresponding to the equivalence point, calculate the supply flow rate of the SBS solution 18 corresponding to the concentration, and transmit a signal for flow regulation to the control valve 38.

In the above-mentioned operation, the reference SBS concentration (Cs) to be provided to the measuring unit 33b of the ORP meter 33 can be calculated by Equation. (1).

Furthermore, the flow rate (F3) of the SBS solution 18 to be added to the filtrate water 14 supplied to the reverse osmosis membrane device 17 can be calculated by Equation (2) so as to correspond to the reducing-agent additive concentration (Csm) at which the change in the ORP value with the change in the reference SBS (Cs) is the largest.

$$Cs = (F1 \times C1)/F2 \quad (1)$$

where
Cs: sample-water reference SBS concentration (mol/L)
C1: metering SBS solution concentration (mol/L)
F1: metering SBS solution flow rate (L/h)
F2: sample water flow rate (L/h).

$$F3 = (F4 \times Csm)/C3 \quad (2)$$

where
F3: supply flow rate (L/h) of the SBS solution 18
F4: RO supply water flow rate (L/h)
C3: SBS solution concentration (mol\L)
Csm: reducing-agent additive concentration (mol/L) corresponding to the equivalence point.

The contents of the calculation by the arithmetic device 34 and the contents of the output to the flow controller 39 will be described below.

1) The metering SBS solution 18a is added to and mixed with the sample water 14a at a constant flow rate while changing the supply flow rate. The electrode 33a of the measuring unit 33b measures the oxidation-reduction potential (ORP) of the mixture 14b after the mixing. The ORP meter 33 obtains the result of the measurement.

Here, the supply flow rate of the metering SBS solution 18a is changed by changing the flow rate of the flow-variable metering pump 36 based on a signal from the sequencer 37 in which a pattern of change is programmed in advance.

2) The pattern of change is formed so that the supply flow rate is changed in a stepwise manner such that the supply amount of the metering SBS solution 18a is maintained for a predetermined period of time by taking into account retention time of the solution flowing from the flow-variable metering pump 36 to the measuring unit 33b and delay in the detection by the electrode 33a.

3) The supply flow rate signal for the metering SBS solution 18a, which is transmitted by the sequencer 37, is also transmitted to the arithmetic device 34 simultaneously. Accordingly, the arithmetic device 34 obtains the relationship between the ORP signal value from the ORP meter 33 and the sample-water reference SBS concentration.

Figure 3:
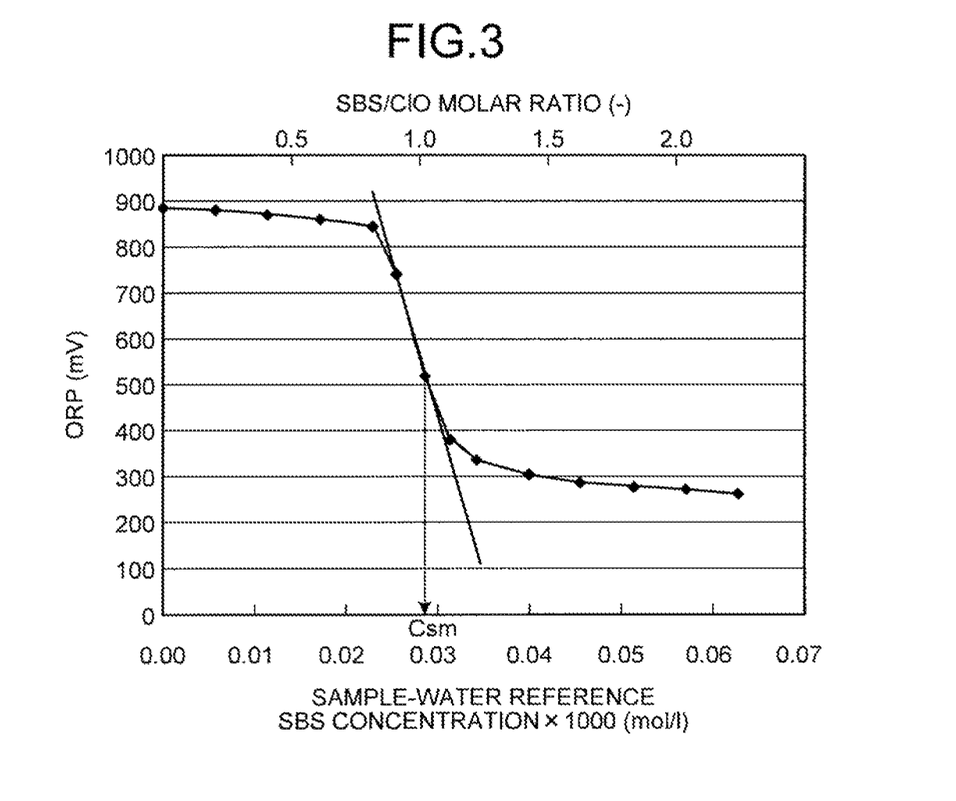
FIG. 3 is a relationship diagram of sample-water reference SBS concentration (mol/L) and an ORP measurement value (mV).

FIG. 3 is a relationship diagram of the sample-water reference SBS concentration (mol/L) and an ORP measurement value (mV). The SBS/ClO molar ratio is also indicated on the horizontal axis on the upper stage of FIG. 3.

As illustrated in FIG. 3, the sample-water reference SBS concentration (Cs) to be provided to the measuring unit 33b is calculated by Equation (1) described above and indicated on the horizontal axis, and the detected ORP value is indicated on the vertical axis so that the relationship is plotted.

In Equation (1) described above, the variables C1 and F2 are input in the arithmetic device 34 in advance, and F1 is automatically input from the sequencer 37 in accordance with the change in the supply flow rate.

4) Subsequently, the arithmetic device 34 obtains sample-water reference SBS equivalence concentration at which the change in the ORP with the change in the SBS concentration is the largest based on the relationship illustrated in FIG. 3. This concentration is the reducing-agent additive concentration (Csm) corresponding to the equivalence point.

This concentration can be automatically obtained by differentiating the smoothing curve connecting measurement values with respect to the SBS concentration (Cs).

5) Furthermore, the arithmetic device 34 calculates the flow rate (F3) of the SBS solution 18 to be supplied to the upstream of the reverse osmosis membrane device 17 so as to correspond to the reducing-agent additive concentration (Csm) corresponding to the equivalence point by Equation (2), and a corresponding signal is transmitted to the flow controller 39.

In Equation (2), the variables F4 and C3 are input in the arithmetic device 34 in advance.

6) When a detection error or the like of each equipment is taken into account, it is possible to transmit to the flow controller 39 a signal corresponding to F3 calculated by substituting (Csm+α) for the reducing-agent additive concentration (Csm) corresponding to the equivalence point in Equation (2). In this case, the value α is appropriately determined as an adjustment value based on the specifications of the equipments and a measurement value using actual seawater.

The signal transmitted from the arithmetic device 34 to the flow controller 39 is transmitted every time a series of steps 1) to 5) is completed, and the interval of the transmission is set in advance.

Conventionally, the absolute value of the ORP varies due to the property (e.g., pH) of seawater, dirt on the ORP electrode, or a lot difference of the ORP sensor itself. Therefore, when the SBS solution is added, if the absolute value of the ORP of the filtrate water after the addition is directly measured and the supply amount of the SBS is controlled by using the measured absolute value as a target value, the injection amount of the SBS may be insufficient or excessive due to the error mentioned above. When the injection amount is insufficient, the RO membrane at the subsequent stage may be damaged, and, when the injection amount is excessive, the running cost may be increased or SBS-induced sulfur compound may be attached to thereby cause clogging.

In contrast, according to the present invention, there are found that (1) the ORP value sharply changes at the equivalence point of the chlorine and the SBS solution as the reducing agent and (2) the equivalence point is maintained stable without being affected by conventional variable factors such as the property of seawater, dirt on the ORP electrode, and the ORP electrode. With these findings, the present invention is made.

That is, when sodium hypochlorite (NaClO) solution for example is used as the chlorine-containing water 12, the oxidation-reduction reaction with SBS (NaHSO$_3$) solution is represented by the following formula.

$$NaClO + NaHSO_3 \rightarrow NaHSO_4 + NaCl$$

With this reaction formula, the equivalence point becomes such that NaClO/NaHSO$_3$=1 (mol/mol), at which the change in the ORP is the largest.

The reducing-agent additive concentration ((Csm), what is called the reducing-agent additive concentration) corresponding to the equivalence point at which the change in the ORP is the largest is obtained by changing the amount of NaHSO$_3$ to be added to the sample water 14a containing NaClO, whereby the equivalent concentration is obtained.

The supply flow rate of the SBS solution 18 to be supplied to the filtrate water 14 as the RO supply water is calculated by Equation (2) described above so as to correspond to the reducing-agent additive concentration (Csm) corresponding to the equivalence point, so that the SBS supply flow rate is adjusted.

According to the present invention, the SBS can stably be injected without excess and deficiency, so that the problems caused by excess or deficiency of the injection amount can be solved, enabling to stably control the supply of the SBS.

The present invention is not limited to the seawater applied as the raw water 11, and brine water such as river water or underground water may be applied.

Furthermore, any chloride compounds containing effective chlorine such as hypochlorous acid, chloric acid, or chlorine gas solution may be applied as the chlorine-containing water 12 according to the present invention.

Test Example

Figure 4:
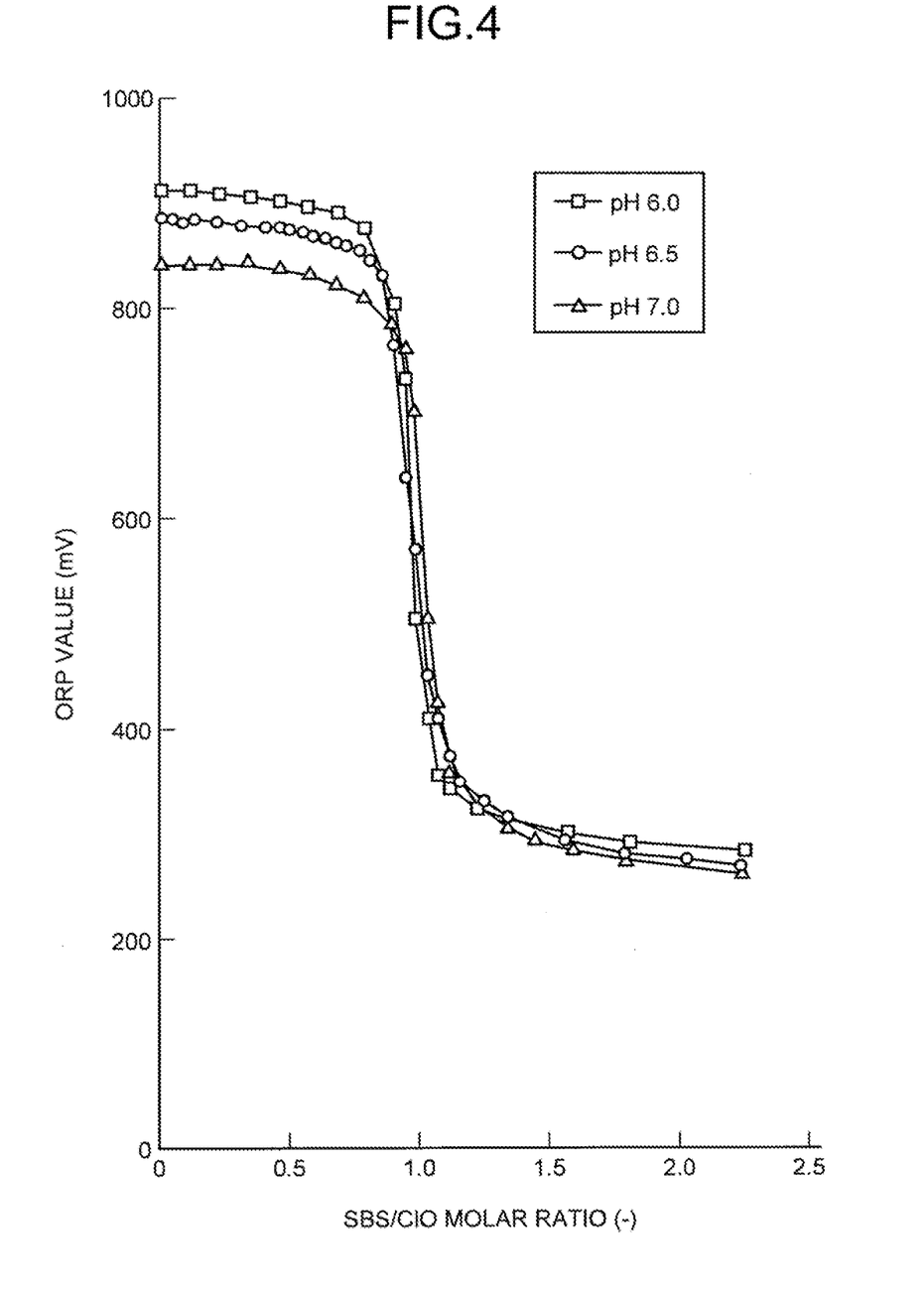
FIG. 4 is a relationship diagram of an ORP value and SBS/ClO molar ratio when pH of raw water is changed.

Next, a test example for explaining the advantages of the present invention will be described below. FIG. 4 is a relationship diagram of the ORP value and the SBS/ClO molar ratio when pH of the raw water is changed.

In this test, three different pH values (pH=6.0, pH=6.5, and pH=7.0) are used.

As illustrated in FIG. 4, even when pH is changed (pH=6.0, pH=6.5, and pH=7.0), the reducing-agent additive concentration (Csm) corresponding to the equivalence point at which the change in the ORP is the largest is approximately identical. Accordingly, it is confirmed that the reducing agent can reliably be added.

Thus, because the SBS as the reducing agent can stably be injected without excess and deficiency, the problems with the conventional technology caused by the excess or deficiency of the injection amount can be solved, enabling to stably control the supply of the SBS.

INDUSTRIAL APPLICABILITY

As described above, according to the desalination apparatus of the present invention, it is possible to smoothly and efficiently neutralize chlorinated raw water by using a reducing agent.

Explanations of Letters or Numerals

10, 100 desalination apparatus
11 raw water
13a pretreatment membrane
13 pretreatment device
14 filtrate water
15 permeated water
16 reverse osmosis membrane
17 reverse osmosis membrane device
18 SBS solution
19 reducing agent tank
30 reducing-agent injection device

The invention claimed is:

1. A desalination apparatus comprising:
a line for flowing raw water with added chlorine-containing water;
an extraction line for extracting a part of the raw water from an extraction position of the line as an extracted water;
a reducing-agent tank for adding a reducing agent solution to the line downstream of the extraction position so as to neutralize chlorine of the raw water;
a control valve provided between the line and the reducing-agent tank, for controlling an additive amount of the reducing agent solution in response to a flow regulation signal;
a reverse osmosis membrane device including a reverse osmosis membrane that removes a salt content from the raw water to thereby produce permeated water, the reverse osmosis membrane device being provided downstream of a supply position of the reducing agent solution;
a metering reducing-agent supply tank that supplies a metering reducing agent solution to the extraction line;
a sequencer that supplies a metering reducing-agent supply signal having a pattern of change;
a flow-variable metering pump provided between the extraction line and the metering reducing-agent supply tank, for changing a supply flow rate of the metering reducing agent solution in response to the metering reducing-agent supply signal;
an oxidation-reduction potential (ORP) meter that measures an oxidation-reduction potential of the extracted water of the extraction line downstream of a supply position of the metering reducing agent solution and produces a ORP signal; and
an arithmetic device configured to:
receive the metering reducing-agent supply signal and the ORP signal;
based on the metering reducing-agent supply signal and the ORP signal, obtain an equivalence point which is a maximum change point of the oxidation-reduction potential of the metering reducing agent solution and chlorine of the extracted water;
obtain a reducing-agent additive concentration (Csm) corresponding to the equivalence point;
obtain the additive amount of the reducing agent solution corresponding to the reducing-agent additive concentration (Csm); and
output the flow regulation signal to the control valve.

2. The desalination apparatus according to claim 1, further comprising a pretreatment membrane that filters suspended matters in the raw water, the pretreatment membrane being provided on the line.

3. The desalination apparatus according to claim 1, wherein the pattern of change of the metering reducing-agent supply signal is configured so that the supply flow rate of the metering reducing agent solution is changed in a stepwise manner.

4. A desalination method implemented by using a reverse osmosis membrane device including a reverse osmosis membrane that removes a salt content from raw water to thereby produce permeated water, the reverse osmosis membrane device being provided on a line for flowing the raw water with added chlorine-containing water, the desalination method comprising:

adding a reducing agent solution to the line so as to neutralize chlorine of the raw water;

extracting a part of the raw water from the line as an extracted water;

controlling an additive amount of the reducing agent solution in response to a flow regulation signal;

removing a salt content from the raw water downstream of a supply position of the reducing agent solution and producing permeated water;

adding a metering reducing agent solution to the extracted water;

supplying a metering reducing-agent supply signal having a pattern of change;

changing a supply flow rate of the metering reducing agent solution in response to the metering reducing-agent supply signal;

measuring an oxidation-reduction potential of the extracted water and producing an ORP signal;

receiving the metering reducing-agent supply signal and the ORP signal;

based on the metering reducing-agent supply signal and the ORP signal, obtaining an equivalence point which is a maximum change point of the oxidation-reduction potential of the metering reducing agent and chlorine of the extracted water;

obtaining a reducing-agent additive concentration (Csm) corresponding to the equivalence point;

obtaining the additive amount of the reducing agent solution corresponding to the reducing-agent additive concentration (Csm); and output the flow regulation signal to the control valve.

5. The desalination method according to claim 4, wherein the pattern of change of the metering reducing-agent supply signal is configured so that the supply flow rate of the metering reducing agent solution is changed in a stepwise manner.

* * * * *